United States Patent [19]

Gönner

[11] Patent Number: 4,801,002
[45] Date of Patent: Jan. 31, 1989

[54] CONVEYING APPARATUS FOR TREE TRUNKS

[75] Inventor: Siegmar Gönner, Oberkirch, Fed. Rep. of Germany

[73] Assignee: Gatterlinck GmbH & Co. KG, Oberkirch, Fed. Rep. of Germany

[21] Appl. No.: 14,863

[22] Filed: Feb. 17, 1987

[30] Foreign Application Priority Data

Feb. 17, 1986 [DE] Fed. Rep. of Germany ......... 360496

[51] Int. Cl.⁴ ............................................. B65G 15/44
[52] U.S. Cl. ..................................... 198/698; 198/822
[58] Field of Search ...................... 198/698, 822, 690.2

[56] References Cited

U.S. PATENT DOCUMENTS

| 3,557,938 | 1/1971 | Christensen | 198/822 X |
| 4,231,464 | 11/1980 | Neilson | 198/822 X |

FOREIGN PATENT DOCUMENTS

| 848701 | 9/1952 | Fed. Rep. of Germany . | |
| 1191292 | 4/1965 | Fed. Rep. of Germany | 198/698 |
| 1295418 | 5/1962 | France | 198/690.2 |
| 506342 | 6/1971 | Switzerland . | |
| 597598 | 3/1978 | U.S.S.R. | 198/822 |
| 1191378 | 11/1985 | U.S.S.R. | 198/822 |
| 1221086 | 3/1986 | U.S.S.R. | 198/822 |

Primary Examiner—Robert J. Spar
Assistant Examiner—Cheryl L. Gstineau
Attorney, Agent, or Firm—Hill, Van Santen, Steadman & Simpson

[57] ABSTRACT

A conveying apparatus for conveying tree trunks through a measuring device is disclosed in which the conveying apparatus comprises at least one transport chain and a plurality of drivers for receiving the tree trunks which are driven by the chain and slide on a guide track. A reliable supporting of the tree trunks on the drivers during transport through the measuring device is achieved which also prevents tilting of the tree trunks by providing drivers which are spaced apart in the conveying direction of the chain. Additionally, the engaging faces of the drivers are designed for receiving the tree trunks and extend perpendicularly to the conveying direction of the chain and are inclined where at least two drivers have oppositely extending inclines in the conveying region.

28 Claims, 4 Drawing Sheets

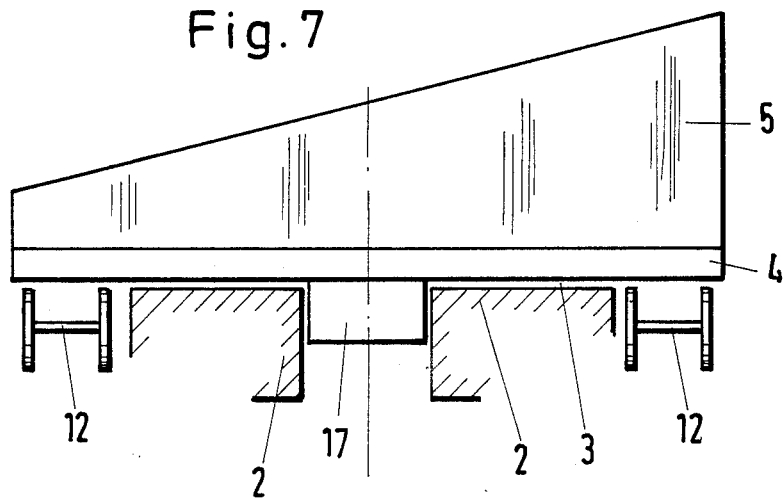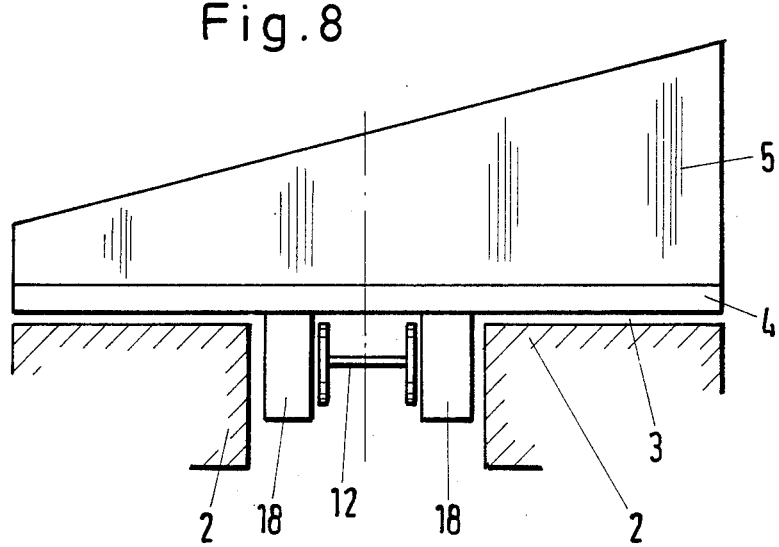

CONVEYING APPARATUS FOR TREE TRUNKS

BACKGROUND OF THE INVENTION

The invention relates to a conveying apparatus for tree trunks, and, in particular, to an apparatus for transporting tree trunks through a trunk measuring means. The apparatus comprises at least one transport chain which is movable in the transport direction and drivers which are secured at intervals to the transport chain and are driven by the latter. The drivers have engagement faces which are inclined in a direction transverse to the transport direction and are capable of sliding or rolling on a guide track.

Chain conveyors with pusher or driver chains are widely used in sawmill technology. The drivers, dogs or pushers consist generally of blocks which are connected to the chains or vertically disposed plate elements having a slightly V-shaped angled support or engaging face. The lowermost point of the driver is disposed in the center of the driver and the legs rise laterally in a direction transverse to the conveying direction. The inclination angles of the driver legs are frequently between 10° and 20° to the horizontal. The engaging faces at the upper side of the drivers may be toothed to prevent trunks slipping on the drivers when starting up and accelerating the conveyor or under the action of any other forces acting on the conveyed trunks. The purpose of the V-shaped angled construction is to make the trunks assume as central a position as possible on the drivers under the action of gravity.

It is also known to optically measure tree trunks for an optimum cutting division. This measuring can take place in the region of a chain bed conveyor, with both an intermittent or a continuous advance of the trunks on the conveyor.

Generally, the opitcal measurement of trunks has been restricted to measuring the diameter of the trunk at predetermined intervals in order to determine the cutting possibilities and thus the utilizability of the trunk cross-section over the length of the trunk. If with a raster camera or a photo-cell means both outer trunk side borders are simultaneously detected at a point to determine the trunk diameter from their position difference, it is of no consequence whether the trunk on its advance up to the next measuring position changes its position on the chain conveyor because of certain support instabilities. The measurement result is not influenced by the three-dimensional position the measuring point has on the trunk.

Since tree trunks are only very rarely ideally straight, however, further steps in optical measuring have recently been taken where, apart from the trunk diameter, attempts are made at various points to detect the position of the trunk axis in order to determine the curvature variation thereof in the manner of a locus curve. From the data acquired and evaluated with the aid of a computer on the basis of the trunk curvature, the optimum severing cut positions are determined to obtain individual portions which are as straight as possible for an optimum cross-section utilization.

In measuring methods in which the path of the trunk axis is measured, it is important that the trunk in the necessary intermittent or continuous advance movement through the measuring station retains the three-dimensional position it has assumed. This requires stable support of the trunk on the chain conveyor. In particular, relatively large trunks having branch stubs can assume a position on the previously described integrally angle-shaped drivers in which although they rest relatively centrally on the drivers they are located on branch stubs. When this occurs the trunks are in an unstable support position in which they can easily rock to and fro between two locations due to the movement forces of the conveyor.

SUMMARY OF THE INVENTION

It is therefore an object of the present invention to provide a conveying apparatus of the aforementioned type for tree trunks which ensures that even curved tree trunks having branch stubs rest on the drivers during transport through a measuring apparatus in a more stable position than known drivers.

This object is achieved since the engagement faces of the drivers are each inclined throughout in only one direction and since the inclination direction alternates in subsequent drivers or groups of drivers.

Generally, the dogs or drivers will be provided alternately with opposite inclination but it would also be possible under particular circumstances, for example, to make in each case two consecutive drivers with equally directed inclination. This might possibly be necessary when the drivers are spaced apart with unequal distances so that after a relatively large interval two drivers follow each other in close succession.

The construction of the drivers according to the present invention with continuous inclines ensures that the tree trunks have a greater possibility of support transversely of the conveying apparatus as well. According to its particular curvature, the supported tree trunk may be located to a greater or lesser extent in the lower or upper region of the incline whereby the inclines extending in alternate directions ensure that the tree trunk is held by both sides. Due to the form of the inclines, the trunk conducts transverse forces via the drivers into the conveying apparatus and these forces must be taken up laterally by the conveying apparatus. Accordingly, suitable support means are to be used in the conveying apparatus to accommodate these forces.

The drivers may have various forms. They may be made such that they overlap in the center of the apparatus as viewed along the conveying direction or they may not overlap or even have a center space. This space, however, must be smaller than the smallest thickness of the tree trunks. Furthermore, various forms of the support faces of the driver are conceivable. For example, the inclined support face of a driver may be straight or curved. Also, the curvature need not necessarily be inward (concave) but can also be outward (convex). To provide a particularly reliable locating of the tree trunks, the respective driver may also have a toothed support face, for example, in the form of a sawtooth extending in the direction of the downwardly directed incline. With such an arrangement of a sawtooth the latter will engage radially into the tree trunk and secure the latter so that no return movement of the trunk in the rising or upward direction of the incline is possible.

As was already explained, since the drivers have the inclines, transverse forces are introduced into the conveying apparatus and they must be taken up by the latter. In one embodiment, the invention accommodates the transverse forces by providing drivers which are made laterally movable with a certain play under the transverse forces.

BRIEF DESCRIPTION OF THE DRAWINGS

Further features and advantages of the present invention are set forth with particularity in the appended claims. The invention may best be understood by making reference to the following description taken in conjunction with the accompanying drawings, in the several figures of which like reference numerals identify identical elements and wherein:

FIG. 7 is a cross-sectional view through a conveying apparatus having two drivers and a guide means; and FIG. 8 is a cross-sectional view through a conveying apparatus comprising a single driver and guide means.

DESCRIPTION OF THE PREFERRED EMBODIMENT

Figure 1:
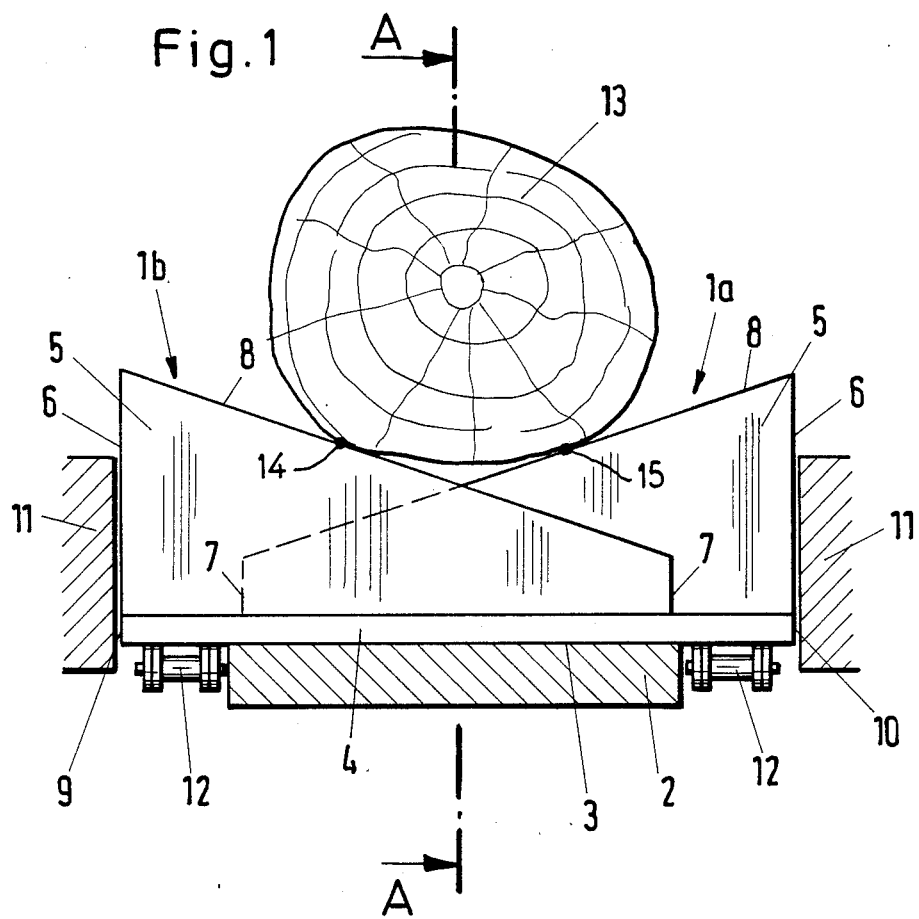
FIG. 1 is a cross-sectional view of a first embodiment of the present invention illustrating a conveying apparatus having overlapping drivers.
Figure 2:
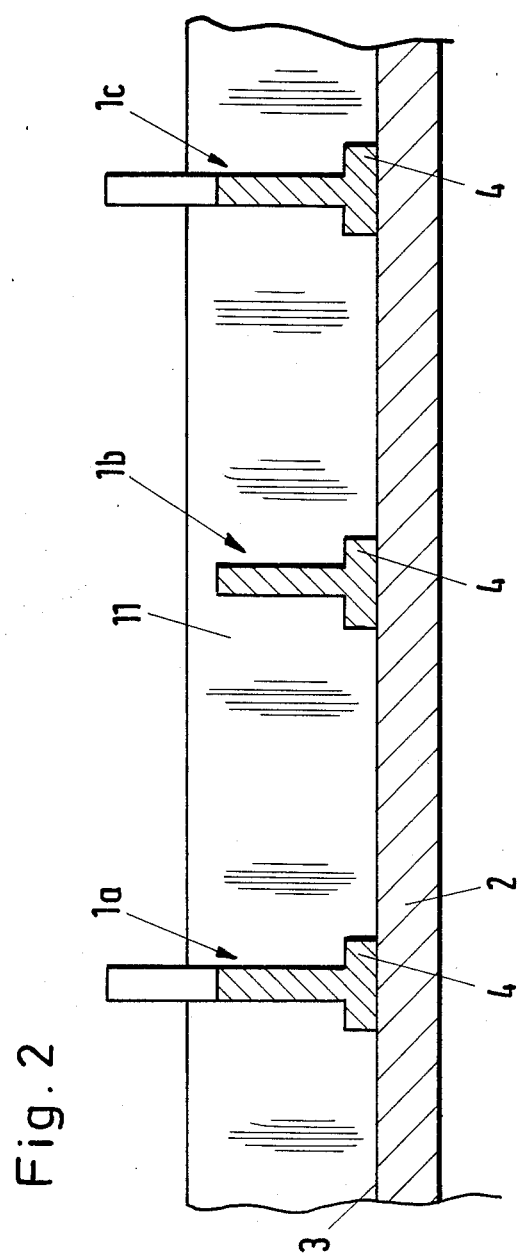
FIG. 2 is a sectional view taken along line A—A of FIG. 1 with the tree trunk removed.

The principles of the present invention are incorporated in a conveying apparatus generally indicated in FIGS. 1 and 2. FIGS. 1 and 2 illustrate a part of a conveying apparatus according to the invention having drivers 1a, 1b and 1c. The drivers 1a, 1b and 1c are disposed on a guide plate 2 extending in the conveying direction and having on its upper side a guide track 3 on which the drivers 1a, 1b and 1c can slide in the longitudinal direction of the plate.

Each driver 1a, 1b and 1c is comprised of a base 4 extending transversely to the conveying direction. The length of the base 4 in the first embodiment substantially corresponds to the width of the conveying bed and is greater than the width of the plate 2. The base 4 is adjoined by the actual support element 5 of each of the drivers 1a, 1b and 1c. The support member 5 extends perpendicularly to the base 4 and to the guide track 3. The edges 6 and 7 of the drivers 1a, 1b and 1c also extend perpendicularly to the guide track 3, the edge 6 being higher than the edge 7 so that the engaging face 8 formed between the upper ends of the edges 6 and 7 is inclined. The drivers 1a, 1b and 1c are guided in the region of the end faces 9 and 10 of the base 4 and possibly in the region of the edges 6 of the support element 5 by two guide blocks 11 extending along the sides of the plate 2. As is apparent from FIG. 1, laterally of the plate 2 on the lower side of the base 4 of each driver 1a, 1b and 1c, coupling members 12 are provided into which a transport chain (not illustrated) engages and acts on the coupling members to displace the drivers 1a, 1b and 1c in the longitudinal direction of the plate 5 and the guide blocks 11.

As FIG. 1 illustrates, the conveying apparatus is loaded with a tree trunk 13. It can be seen that the tree trunk 13 rests on the point 14 on the driver 1b and on the point 15 on the driver 1a.

In FIGS. 1 and 2, the mounting of the plate 2 is not shown in detail, but is usually effected in a base frame of the conveying apparatus. Usually the drive of the drivers 1a, 1b and 1c is by means of one or two circulating transport chains.

In a second embodiment illustrated in FIG. 7, two such transport chains are present and their coupling members are denoted by 12. These transport chains extend parallel to each other and enclose a divided guide plate 2. Between the two parts of the guide plate beneath the base 4 a guide element 17 is disposed which is guided by the divided plates 2. This makes it possible to dispense with the guide blocks 11 shown in FIG. 1.

When a single transport chain is provided as illustrated in the third embodiment of FIG. 8, the support plate 2 is preferably divided into two sections so that the chain can run in a longitudinal gap disposed in the center. This simultaneously provides lateral guiding of the drivers 1a, 1b and 1c. For this purpose at the lower side of the base 4 between the divided guide plates 2, a pair of buffers 18 are located. Between these parts of the pair of buffers 18 coupling members 12 of the transport chain are secured. By guiding the pair of buffers 18 between the rigid parts of the guide plates 2 it is once again not necessary to provide guide blocks 11.

FIG. 2 illustrates only a fragment of the conveying apparatus in order to clarify the spaced arrangement of the drivers 1a, 1b and 1c. For a stable position of a trunk it is not necessary for the drivers to be arranged in close succession. A curved trunk will in any case hardly rest on more than three drivers so that the minimum spacing of the drivers can be adapted to still provide a reliable conveying.

It is essential for the tree trunk 13 to come to lie on an engaging face 8 which is inclined. The drivers 1a and 1b or 1b and 1c have, in the illustrated conveying region, engaging faces 8 inclined in opposite directions. Due to the inclines, the drivers 1a, 1b and 1c transmit onto the guide blocks 11 not only the forces acting due to gravity on the plate 2, but also transverse forces in the direction of guide blocks 11. When a tree trunk 13 rests on the drivers 1a, 1b and 1c the drivers 1a, 1b and 1c thus additionally engage the corresponding guide block 11.

Figure 3:
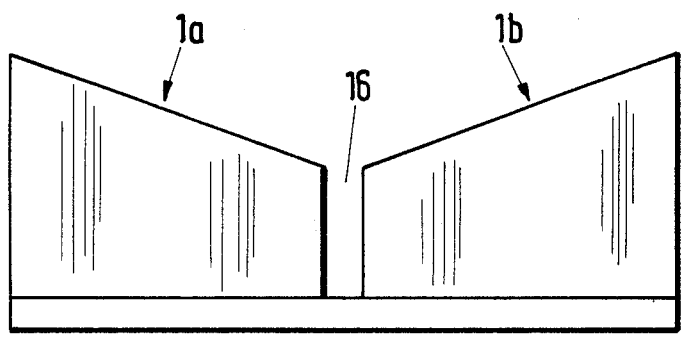
FIG. 3 is a simplified view of FIG. 1 which illustrates two drivers which do not overlap and between which a central space is formed.

The drivers 1a, 1b and 1c according to the invention may be formed in various ways to obtain the advantages according to the invention. Thus, it is apparent from FIG. 1 that the engaging face 8 of the drivers does not extend from one guide block 11 to the other guide block 11, rather the lower edge 7 of the support element 5 terminates at a distance from the respective guide block 11. It is essential in the embodiment of FIG. 1 that the drivers 1a and 1b overlap in their projection as viewed in the longitudinal direction. FIG. 3 illustrates two drivers 1a and 1b which do not overlap but leave between them a central spacing 16. Not shown in FIG. 3 are the details of FIG. 1. Basically, the steeper the engaging faces 8 are the more stable the support and less the drivers 1a, 1b and 1c overlap. There are, however, limits here in the practical, technical execution.

Figure 4:
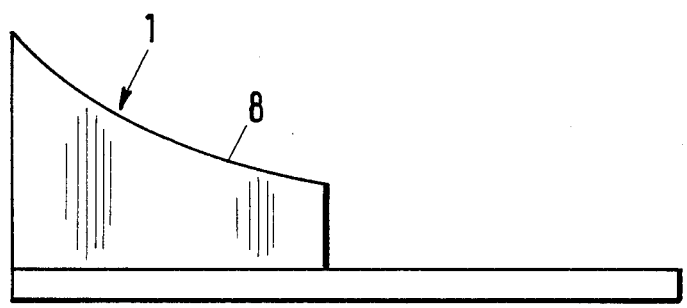
FIG. 4 illustrates a driver with an inwardly curved engaging face.
Figure 5:
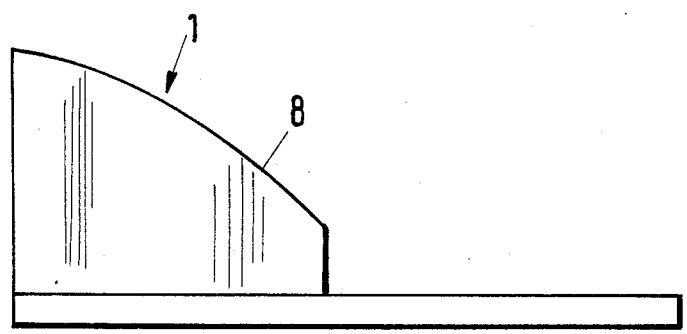
FIG. 5 illustrates a driver with an outwardly curved engaging face.
Figure 6:
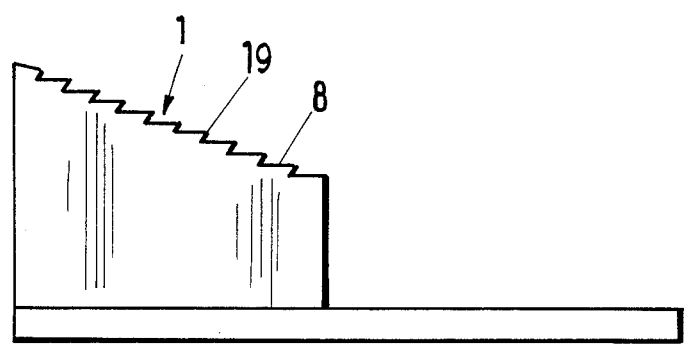
FIG. 6 illustrates a driver with a substantially straight but toothed engaging face.

FIG. 4 illustrates a driver 1 which is formed substantially similar to the drivers 1a and 1b illustrated in FIG. 3, but has an engaging face 8 which is inwardly or concavely curved. Alternatively, FIG. 5 illustrates a driver 1 similar to the illustration of FIG. 4 in which the engaging face 8 is outwardly or convexly curved. Additionally, FIG. 6 illustrates a driver 1 which is made substantially similar to the driver 1 of FIG. 3, but in this case the inclined engaging face 8 has sawteeth 19 directed toward the center. It is obvious that drivers 1a, 1b and 1c are similar to the drivers 1 illustrated in FIGS.

4 to 6 and may exist in accordance with the illustration of FIGS. 1 and 3 and may overlap or not overlap, possibly even having a central spacing 16 between them.

While several embodiments of the present invention have been shown and described, modifications may be made without departing from the teachings of the present invention. Accordingly, the scope of the invention is only to be limited as necessitated by the accompanying claims.

I claim:

1. In a conveying apparatus having a conveying bed for transporting tree trunks and the like having at least one transport chain driven in the transport direction and a plurality of longitudinally spaced drive units secured at intervals to the at least one transport chain, each of the drive units being driven by the at least one transport chain and having engaging faces contacting said trunk which are inclined in a direction transverse to the transport direction, said drive units being supported on a guide track, the improvement comprising: the plurality of drive units having respective engaging faces which are inclined in only one direction, said drive units being arranged so that the direction of inclination of each engaging face alternates between successive drive units and the engaging faces are longitudinally spaced from each other.

2. In a conveying apparatus having a conveying bed for transporting tree trunks and the like having at least one transport chain driven in the transport direction and a plurality of longitudinally spaced drive units secured at intervals to the at least one transport chain, the drive units being driven by the at least one transport chain and having engaging faces contacting said trunk which are inclined in a direction transverse to the transport direction, said drive units being supported on a guide track, the improvement comprising:

the plurality of drive units having respective engaging faces which are inclined in only one direction, said drive units being arranged so that the direction of inclination of each engaging face alternates between successive drive units, and said drive units of both inclination directions extend substantially over the entire width of the conveying bed of the conveying apparatus.

3. The conveying apparatus of claim 1, wherein the width of said drive units is less than the width of the conveying bed of the conveying apparatus and said drive units have their higher side of their inclined engaging faces border the outer sides of the conveying bed.

4. The conveying apparatus of claim 3, wherein said drive units of opposite inclination direction overlap in the central region of said conveying bed in the area of the lower ends of their inclined engaging faces.

5. The conveying apparatus of claim 3, wherein the lower ends of the inclined engaging faces of said drive units of opposite inclination direction are spaced apart in a direction transverse to the transport direction in the central region of the conveying bed.

6. The conveying apparatus of claim 1, wherein said engaging faces of said drive units are rectilinear in the inclination direction.

7. The conveying apparatus of claim 1, wherein said engaging faces of said drive units are concavely curved in the inclination direction.

8. The conveying apparatus of claim 1, wherein said engaging faces of said drive units are convexly curved in the inclination direction.

9. The conveying apparatus of claim 1, wherein said engaging faces of said drive units have teeth.

10. The conveying apparatus of claim 2, wherein said engaging faces of said drive units are rectilinear in the inclination direction.

11. The conveying apparatus of claim 2, wherein said engaging faces of said drive units are concavely curved in the inclination direction.

12. The conveying apparatus of claim 2, wherein said engaging faces of said drive units are convexly curved in the inclination direction.

13. The conveying apparatus of claim 2, wherein said engaging faces of said drive units have teeth.

14. The conveying apparatus of claim 3, wherein said engaging faces of said drive units are rectilinear in the inclination direction.

15. The conveying apparatus of claim 3, wherein said engaging faces of said drive units are concavely curved in the inclination direction.

16. The conveying apparatus of claim 3, wherein said engaging faces of said drive units are convexly curved in the inclination direction.

17. The conveying apparatus of claim 3, wherein said engaging faces of said drive units have teeth.

18. The conveying apparatus of claim 4, wherein said engaging faces of said drive units are rectilinear in the inclination direction.

19. The conveying apparatus or claim 4, wherein said engaging faces of the said drive units are convcavely curved in the inclination direction.

20. The conveying apparatus of claim 4, wherein said engaging faces of said drive units are convexly curved in the inclination direction.

21. The conveying apparatus of claim 4, wherein said engaging faces of said drive units have teeth.

22. The conveying apparatus of claim 5, wherein said engaging faces of said drive units are rectilinear in the inclination direction.

23. The conveying apparatus of claim 5, wherein said engaging faces of said drive units are concavely curved in the inclination direction.

24. The conveying apparatus of claim 5, wherein said engaging faces of said drive units are convexly curved in the inclination direction.

25. The conveying apparatus of claim 5, wherein said engaging faces of said drive units have teeth.

26. The conveying apparatus of claim 6, wherein said engaging faces of said drive units have teeth.

27. The apparatus of claim 1, wherein each drive unit comprises one drive member and wherein each drive member has a face that forms the engagement face for that drive unit.

28. The apparatus of claim 1, wherein each drive unit comprises a plurality of drive members and wherein each drive member has a face, the faces of the drive members in each drive unit in combination forming the engagement face for that drive unit.

* * * * *